US011037437B2

(12) United States Patent
He et al.

(10) Patent No.: US 11,037,437 B2
(45) Date of Patent: Jun. 15, 2021

(54) REMOTE CONTROLLER (71) Applicant: SZ DJI TECHNOLOGY CO., LTD., Shenzhen (CN)

(72) Inventors: Baichuan He, Shenzhen (CN); Wenbo Li, Shenzhen (CN); Yumian Deng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/725,647

(22) Filed: Dec. 23, 2019

(65) Prior Publication Data

US 2020/0135011 A1 Apr. 30, 2020

Related U.S. Application Data

(63) Continuation of application No. PCT/CN2017/108393, filed on Oct. 30, 2017.

(30) Foreign Application Priority Data

Aug. 30, 2017 (CN) .......................... 201721106108.4

(51) Int. Cl.
*G08C 17/02* (2006.01)
*G05D 1/10* (2006.01)
*G05G 1/04* (2006.01)

(52) U.S. Cl.
CPC ............. *G08C 17/02* (2013.01); *G05D 1/101* (2013.01); *G05G 1/04* (2013.01)

(58) Field of Classification Search
CPC ...................................................... G08C 17/02
See application file for complete search history.

(56) References Cited

U.S. PATENT DOCUMENTS 9,624,704 B1 4/2017 Hsu
10,284,693 B2 * 5/2019 Deng ..................... G08C 17/02
(Continued)

FOREIGN PATENT DOCUMENTS

| CN | 1785466 A | 6/2006 |
| CN | 204904547 U | 12/2015 |
| CN | 105468021 A | 4/2016 |

(Continued)

OTHER PUBLICATIONS

The World Intellectual Property Organization (WIPO) International Search Report for PCT/CN2017/108393 dated May 22, 2018 5 pages.

*Primary Examiner* — K. Wong
(74) *Attorney, Agent, or Firm* — Anova Law Group, PLLC (57) ABSTRACT

A remote controller includes a remote controller main body, a remote-control lever assembly, and a clamp assembly. The remote controller main body is formed with storage slots corresponding to the remote-control lever assembly. The remote-control lever assembly is detachably connected to the remote controller main body. When detached from the remote controller main body, the remote-control lever assembly is configured to be stored in the storage slots. The clamp assembly is movably connected to the remote controller main body and is capable of unfolding or folding from the remote controller main body. When being folded, the clamp assembly is configured to cover the remote-control lever assembly stored in the storage slots.

17 Claims, 5 Drawing Sheets

(56) References Cited

U.S. PATENT DOCUMENTS

2017/0262009 A1* 9/2017 Peng .................. G05G 9/047
2019/0199046 A1* 6/2019 Yuan .................. B64C 39/024

FOREIGN PATENT DOCUMENTS

| CN | 205541399 U | 8/2016 |
| CN | 206117713 U | 4/2017 |
| CN | 106714922 A | 5/2017 |
| CN | 206175991 U | 5/2017 |
| CN | 107074353 A | 8/2017 |
| CN | 107111330 A | 8/2017 |
| CN | 107111929 A | 8/2017 |
| CN | 207219212 U | 4/2018 |

\* cited by examiner

REMOTE CONTROLLER

CROSS-REFERENCE TO RELATED APPLICATIONS

This application is a continuation of International Application No. PCT/CN2017/108393, filed on Oct. 30, 2017, which claims the priority of Chinese Patent Application No. CN201721106108.4, filed on Aug. 30, 2017, the entire contents of both of which are incorporated herein by reference.

TECHNICAL FIELD

The present disclosure relates to a remote controller.

BACKGROUND

Unmanned Aerial Vehicles (UAVs) have become a popular aerial photography tool with high operability. A user usually uses a remote controller to control flight of a UAV, and connects a mobile communication terminal such as a mobile phone to the remote controller, so that the mobile terminal can receive and display image data captured by the UAV in real time through the remote controller, and share the image data with other devices.

The remote controller is usually equipped with a remote-control lever, but the remote-control lever is raised higher on a surface of the remote controller, so that portability of the remote controller is lowered. The remote-control lever is usually placed separately after being disassembled. This situation often causes a loss of the remote-control lever.

SUMMARY

In accordance with the disclosure, there is provided a remote controller. The remote controller includes a remote controller main body, a remote-control lever assembly, and a clamp assembly. The remote controller main body is formed with storage slots corresponding to the remote-control lever assembly. The remote-control lever assembly is detachably connected to the remote controller main body. When detached from the remote controller main body, the remote-control lever assembly is configured to be stored in the storage slots. The clamp assembly is movably connected to the remote controller main body and is capable of unfolding or folding from the remote controller main body. When being folded, the clamp assembly is configured to cover the remote-control lever assembly stored in the storage slots.

The remote controller provided by the present disclosure can conveniently accommodate the remote-control lever assembly in the storage slots of the remote controller main body by providing the storage slots and a receiving assembly, thereby improving portability of the remote controller, reducing probability of damaging the remote-control lever assembly, and preventing a remote-control lever from being lost.

BRIEF DESCRIPTION OF THE DRAWINGS

To more clearly illustrate the technical solution of the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Example embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Figure 1:
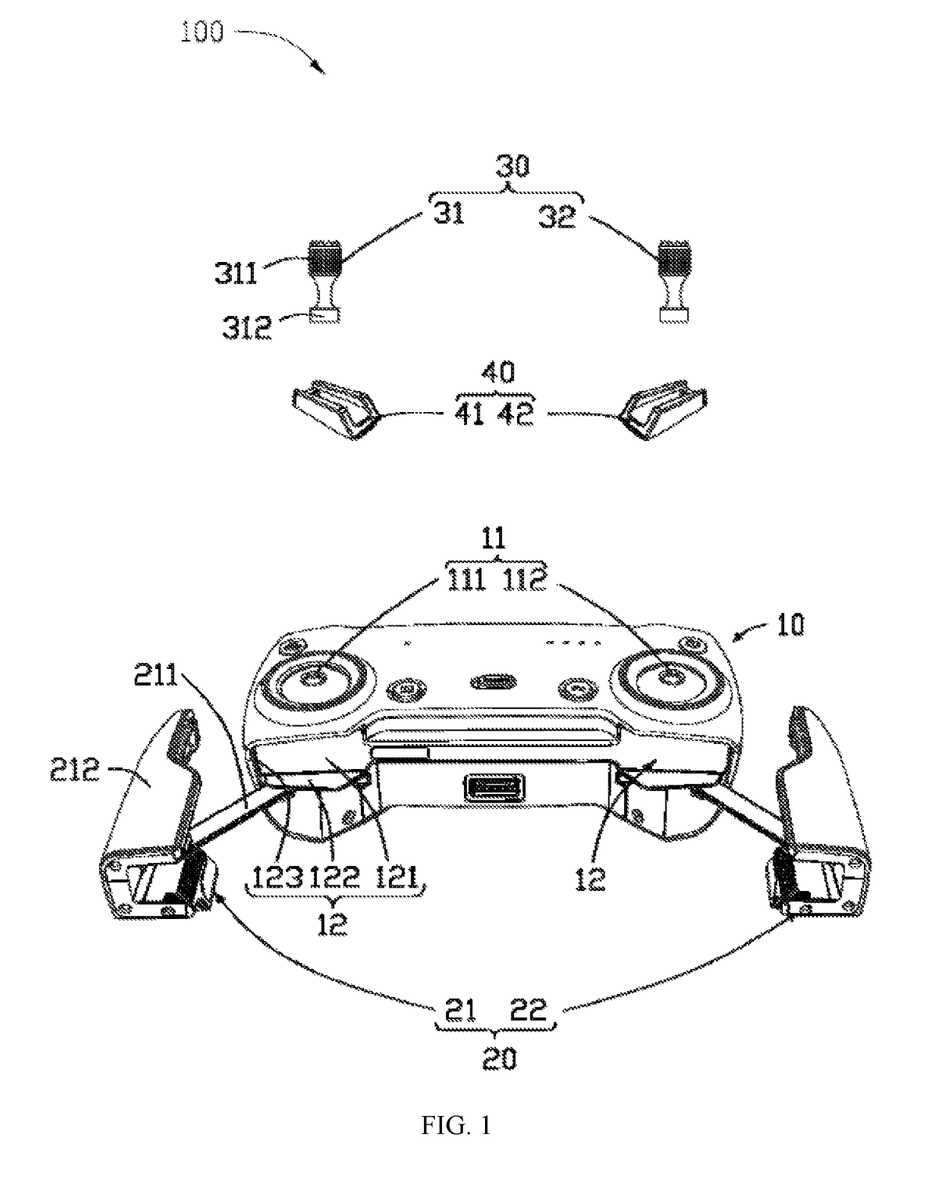
FIG. 1 is a schematic exploded view of an exemplary remote controller according to various embodiments of the present disclosure.
Figure 2:
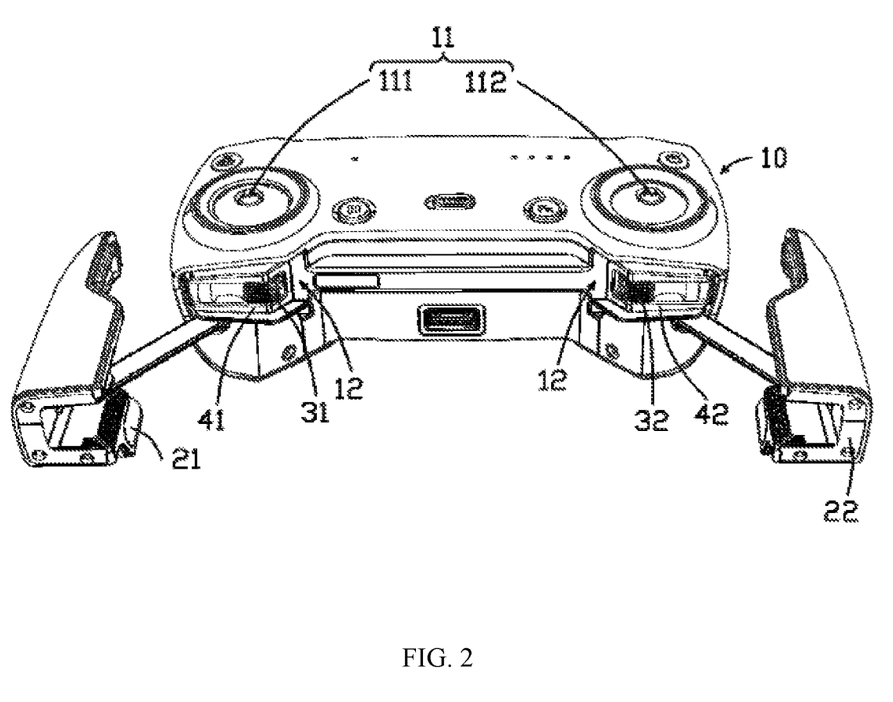
FIG. 2 is a schematic view showing an exemplary assembled structure of the remote controller shown in FIG. 1.

Referring to FIG. 1 and FIG. 2, FIG. 1 is a schematic exploded view of a remote controller provided by the present disclosure, and FIG. 2 is a schematic view showing an assembled structure of the remote controller shown in FIG. 1. A remote controller 100 includes a remote controller main body 10, a clamp assembly 20, a remote-control lever assembly 30, and a receiving assembly 40. The remote controller main body 10 is a main structure of the remote controller 100. The clamp assembly 20 is connected to a side of the remote controller main body 10. The receiving assembly 40 is disposed on the remote controller main body 10. The remote-control lever assembly 30 can be received in the receiving assembly 40.

The remote controller main body 10 is configured to control a controlled terminal (not shown), receive data returned by the controlled terminal, and transmit the received data to a mobile terminal through a data line (not shown). The remote controller main body 10 includes a control button assembly 11 disposed on a control panel of the remote controller main body 10 and storage slots 12 formed in the remote controller main body 10.

The control button assembly 11 includes a first control button 111 and a second control button 112. The first control button 111, the second control button 112, and other controls on the control panel are used to control the controlled terminal.

The storage slots 12 are recessed by the remote controller main body 10. Alternatively, a quantity of the storage slots 12 is two, and the two storage slots 12 are respectively formed at two ends of a side of the remote controller main body 10. The two storage slots 12 may also be disposed on other surfaces of the remote controller main body 10, which is not limited by the present disclosure. Each of the storage slots 12 includes a bottom wall 121, two oppositely-disposed sidewalls 122, and a stop plate 123. The sidewalls 122 and the stop plate 123 protrude from the bottom wall 121 and define the storage slots 12 together with the bottom wall 121. The two storage slots 12 have a U-shaped cross section.

Taking a UAV as the controlled terminal as an example, the remote controller main body 10 can control flight of the UAV, receive image data acquired by the UAV during an aerial photography process, and transmit the received image data to a mobile terminal for previewing and sharing to the Internet or a friend. The mobile terminal may also be directly connected to the remote controller main body, to display flight status, parameters, shooting pictures, and shooting parameters. In the present disclosure, the mobile terminal may be a mobile phone, a tablet computer, or a notebook computer. In one embodiment, the mobile terminal is a mobile phone.

The clamp assembly 20 is disposed at a side of the remote controller main body 10. The clamp assembly 20 includes a first clamp element 21 and a second clamp element 22. The first clamp element 21 and the second clamp element 22 are movably connected to two ends of the side of the remote controller main body 10, respectively.

The first clamp element 21 includes a connection rod 211 and a clamp part 212. One end of the connection rod 211 is movably connected to one end of the side of the remote controller main body 10, and the other end of the connection rod 211 is connected to the clamp part 212.

The connection rod 211 is movably connected to one end of a top of the remote controller main body 10. Alternatively, the connection rod 211 can be rotated around a side of the remote controller main body 10 within a predetermined range, and the connection rod 211 and the remote controller main body 10 are connected with a damped connection, that is, the connection rod 211 can stop at any point within its range of rotation.

The clamp part 212 is connected to the other end of the connection rod 211. The clamp part 212 is for clamping the mobile terminal.

The second clamp element 22 is disposed at the other end of the side of the remote controller main body 10 and is similar in structure and symmetrically disposed to the first clamp element 21. The second clamp element 22 cooperates with the first clamp element 21 to clamp and fix the mobile terminal. The second clamp element 22 also includes a connection rod and a clamp part. One end of the connection rod of the second clamp element 22 is connected to the remote controller main body 10, the other end is connected to the clamp part of the second clamp element 22, and the connection rod of the second clamp element 22 is connected to the remote controller main body 10 also with a damped connection. The clamp part of the second clamp element 22 is configured to cooperate with the clamp part 212 to clamp the mobile terminal. In one embodiment, the second clamp element 22 is identical in structure to the first clamp element 21. In other embodiments, the second clamp element 22 may not be identical in structure to the first clamp element 21, which is not limited by the present disclosure.

When the first clamp element 21 and the second clamp element 22 of the clamp assembly 20 are in an unfolded state, the two storage slots 12 are in an unobstructed state. When the first clamp element 21 and the second clamp element 22 of the clamp assembly 20 are in a folded state, the two storage slots 12 are covered by the first clamp element 21 and the second clamp element 22, respectively. Alternatively, the two storage slots 12 are respectively covered by the clamp part 212 of the first clamp element 21 and the clamp part of the second clamp element 22. The remote-control lever assembly 30 includes a first remote-control lever 31 and a second remote-control lever 32. When the remote controller 100 is in a normal state, the first remote-control lever 31 and the second remote-control lever 32 are respectively connected to the first control button 111 and the second control button 112. A user can more conveniently control the controlled terminal through the first remote-control lever 31 and the second remote-control lever 32.

The first remote-control lever 31 includes a control end 311 and a connection end 312. The connection end 312 is detachably connected to the first control button 111. The control end 311 is used to facilitate the user's operation, that is, the user can control the first control button 111 by manipulating the control end 311 to control the controlled terminal.

The second remote-control lever 32 also includes a control end and a connection end. In one embodiment, the second remote-control lever 32 is identical to the first remote-control lever 31, and details are not described herein. The second remote-control lever 32 is connected to the second control button 112. Alternatively, the connection end 312 of the second remote-control lever 32 is detachably connected to the second control button 112. The control end of the second remote-control lever 32 is used to facilitate the user's operation, that is, the user can control the second control button 112 by manipulating the control end of the second remote-control lever 32, to control the controlled terminal.

The receiving assembly 40 is disposed at the top of the remote controller main body 10. The receiving assembly 40 includes a first receiving element 41 and a second receiving element 42. The first receiving element 41 and the second receiving element 42 are respectively embedded in the two storage slots 12 of the remote controller main body 10, and the first receiving element 41 and the second receiving element 42 are connected to the corresponding storage slots 12. Alternatively, the first receiving element 41 and the second receiving element 42 are connected to the corresponding storage slots 12 by at least one of an elastic snapping, a magnetic connection, a bonding, or the like. In one embodiment, the first receiving element 41 and the second receiving element 42 are connected to the corresponding storage slots 12 by an adhesive bonding. In addition, the receiving assembly 40 is a receiving assembly having elasticity.

Figure 3:
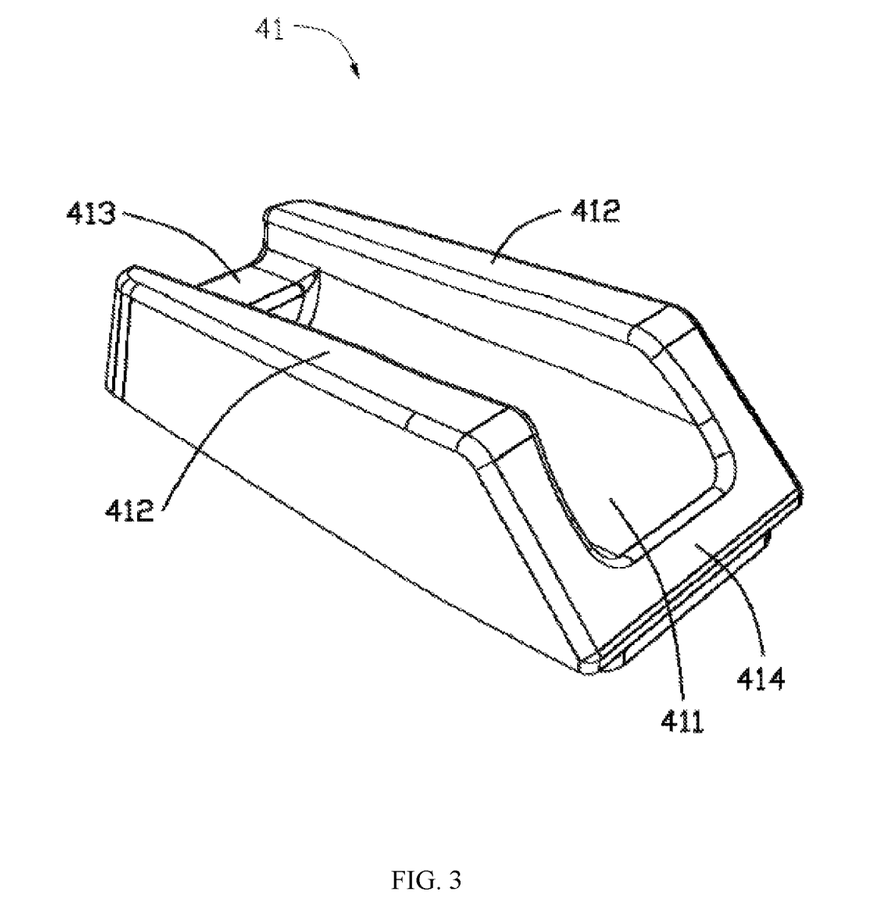
FIG. 3 is a schematic structural view of a first receiving element of the remote controller shown in FIG. 1.

Referring to FIG. 3, the first receiving element 41 is disposed in one of the storage slots 12. The first receiving element 41 is disposed in cooperation with the storage slots 12. In one embodiment, the first receiving element 41 is embedded in the storage slots 12. The first receiving element 41 is configured to receive and limit the first remote-control lever 31 detached from the first control button 111. The first receiving element 41 is elastic. In one embodiment, the first receiving element 41 is made of a rubber material. In other embodiments, the first receiving element may be made of other elastic materials, which is not limited in the present disclosure. The first receiving element 41 is disposed in cooperation with the first remote-control lever 31. In other words, the first receiving element 41 can match, receive, and fix the first remote-control lever 31, so that the first remote-control lever 31 is just stuck in the first receiving element 41. The first receiving element 41 includes a bottom plate 411, two oppositely-disposed side plates 412, a front block 413, and a rear block 414. The two oppositely-disposed side plates 412, the front block 413, and the rear block 414 are disposed on a same surface of the bottom plate 411. The front block 413 and the rear block 414 are respectively disposed at two opposite ends of the same surface of the bottom plate 411. The two oppositely-disposed side plates 412 are disposed on other two ends of the same surface of the bottom plate 411. The bottom plate 411, the two oppositely-disposed side plates 412, the front block 413, and the rear block 414 cooperate to enclose a receiving space. In one embodiment, one of the side plates 412, the front block 413, the other of the side plates 412, and the rear block 414 are disposed end to end in the same surface of the bottom plate 411. The bottom plate 411, the two oppositely-disposed side plates 412, the front block 413, and the rear block 414 cooperate to enclose a receiving space. The receiving space is used to receive the first remote-control lever 31. In one embodiment, the first receiving element 41 is an integrally formed structure.

The bottom plate 411 is connected to the bottom wall 121. Alternatively, the bottom plate 411 and the bottom wall 121 are fixed by a bonding. In one embodiment, the bottom plate 411 has a rectangular-like structure, and a width of the bottom plate 411 is gradually narrowed in a direction from the rear block 414 toward the front block 413. In other embodiments, the bottom plate 411 may also be other structures, which is not limited by the present disclosure.

The two oppositely-disposed side plates 412 are disposed at opposite ends of the bottom plate 411, and are connected to the front block 413 and the rear block 414. The two oppositely-disposed side plates 412 and the two oppositely-disposed sidewalls 122 of the storage slots 12 are respectively abutted. In one embodiment, heights of the two oppositely-disposed side plates 412 gradually decrease in the direction from the rear block 414 toward the front block 413. In other embodiments, the two oppositely-disposed side plates 412 may be other structures, which are not limited in the present disclosure.

The front block 413 is disposed at one end of the bottom plate 411 and is respectively connected to the two oppositely-disposed side plates 412. In one embodiment, a height of the front block 413 is smaller than the heights of the two oppositely-disposed side plates 412.

The rear block 414 is disposed at the other end of the bottom plate 411 and is connected to the two oppositely-disposed side plates 412. In addition, the rear block 414 is disposed opposite to the front block 413. In one embodiment, a height of the rear block 414 is smaller than the heights of the two oppositely-disposed side plates 412, and the height of the rear block 414 is smaller than the height of the front block 413. In other embodiments, the height relationship between the rear block 414 and the front block 413 may also be other height relationships, which is not limited by the present disclosure.

To more clearly understand a manner of receiving the remote-control lever assembly 30, the manner of receiving the remote-control lever assembly 30 will be further described below.

Figure 4:
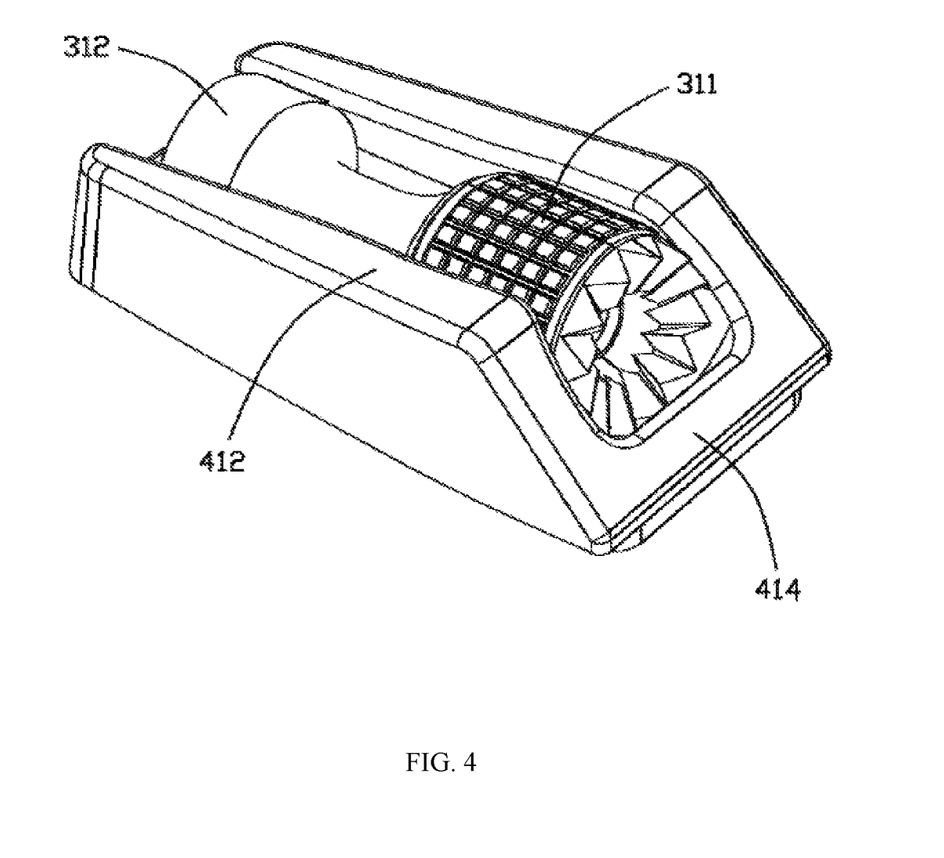
FIG. 4 is a schematic view showing an assembled structure of a first remote-control lever and a first receiving element of the remote controller shown in FIG. 2.
Figure 5:
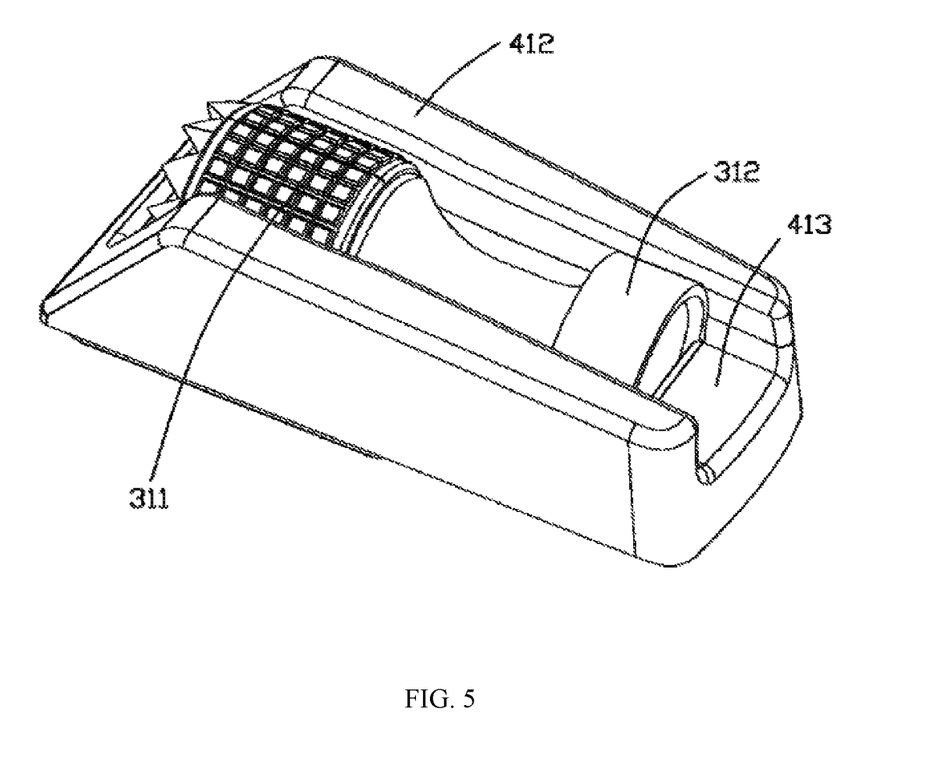
FIG. 5 is a schematic view from another angle showing an assembled structure of a first remote-control lever and a first receiving element of the remote controller shown in FIG. 2.

Referring to FIG. 4 and FIG. 5, when the first clamp element 21 is in an unfolded state, the first receiving element 41 is also in an unobstructed state. Therefore, the first remote-control lever 31 can be placed and received in the first receiving element 41, and the first remote-control lever 31 can be just stuck in the first receiving element 41. At this time, the first remote-control lever 31 abuts against the bottom plate 411. The front block 413 of the first receiving element 41 abuts an end of the connection end 312 of the first remote-control lever 31, and the rear block 414 of the first receiving element 41 abuts an end of the control end 311 of the first remote-control lever 31, thereby restricting the movement of the first remote-control lever 31 in its axial direction. In addition, the end of the control end 311 is in an exposed state, thereby facilitating the user to pull it out.

The two oppositely-disposed side plates 412 of the first receiving element 41 abut against the control end 311 and the connection end 312 of the first remote-control lever 31, thereby limiting the movement of the first remote-control lever 31 in its radial direction. The heights of the two oppositely-disposed side plates 412 of the first receiving element 41 at a side corresponding to the control end 311 is greater than a radius of the control end 311, and a width of the two oppositely-disposed side plates 412 of the first receiving element 41 at the side corresponding to the control end 311 is slightly smaller than a diameter of the control end 311. In addition, the two oppositely-disposed side plates of the first receiving element and the second receiving element have a cuff design on the side corresponding to the control end 311, and a relative distance at the cuff between tops of the two oppositely-disposed side plates is smaller than the diameter of the control end 311. Similarly, the heights of the two oppositely-disposed side plates 412 of the first receiving element 41 at a side corresponding to the connection end 312 is greater than a radius of the connection end 312, and a width of the two oppositely-disposed side plates 412 of the first receiving element 41 at the side corresponding to the connection end 312 is slightly smaller than a diameter of the connection end 312. Therefore, the first receiving element 41 can firmly receive and limit the first remote-control lever 31.

When the first clamp element 21 is in a folded state, the clamp part 212 of the first clamp element 21 covers one corresponding storage slot of the storage slots 12, and also covers the first receiving element 41, which can prevent the first remote-control lever 31 being dropped out from the first receiving element 41.

Similarly, when the second clamp element 22 is in an unfolded state, a storage slot of the storage slots 12 corresponding to the second clamp element 22 is in an unfolded state. The second receiving element 42 can be inserted into the corresponding storage slot of the storage slots 12 and used to receive the second remote-control lever 32. In one embodiment, the second receiving element 42 is identical to the first receiving element 41, and the second receiving element 42 is connected to the storage slots 12 in a same manner as the first receiving element 41 being connected to the storage slots 12. In addition, since the second remote-control lever 32 is identical to the first remote-control lever 31, the second receiving element 42 receives the second remote-control lever 32 in a same manner as the first receiving element 41 accommodating the first remote-control lever 31, which will not be described again here. In addition, when the second clamp element 22 is in a folded state, the clamp part of the second clamp element 22 covers the corresponding storage slots 12 and also covers the second receiving element 42 to prevent the second remote-control lever 32 from being dropped out from the second receiving element 42.

In various embodiments, the storage slots 12 formed in the remote controller main body 10 correspond to the remote-control lever assembly 30, while the remote-control lever assembly 30 is detachably connected to the remote controller main body 10. When detached from the remote controller main body 10, the remote-control lever assembly 30 is configured to be stored in the storage slots 12. As such, the remote controller 100 of the present disclosure can conveniently accommodate the remote-control lever assembly 30 in the storage slots 12 of the remote controller main body 10 by providing the storage slots 12 and the receiving assembly 40, thereby reducing a volume of the remote controller 100, lowering probability of damaging the remote controller main body 10, and preventing the remote-control lever from being lost.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A remote controller, comprising:
a remote controller main body;
a remote-control lever assembly; and
a clamp assembly, wherein:
the remote controller main body is formed with storage slots corresponding to the remote-control lever assembly;
the remote-control lever assembly is detachably connected to the remote controller main body;
when detached from the remote controller main body, the remote-control lever assembly is configured to be stored in the storage slots;
the clamp assembly is movably connected to the remote controller main body and is capable of unfolding or folding from the remote controller main body; and
when being folded, the clamp assembly is configured to cover the remote-control lever assembly stored in the storage slots.

2. The remote controller of claim 1, wherein:
the storage slots are formed at a side of the remote controller main body.

3. The remote controller of claim 2, wherein:
each of the storage slots includes a bottom wall, two oppositely-disposed sidewalls, and a stop plate, wherein the two oppositely-disposed sidewalls and the stop plate are disposed on a same side of the bottom wall.

4. The remote controller of claim 1, further comprising:
a receiving assembly, corresponding to the remote-control lever assembly, wherein the receiving assembly is configured to receive the remote-control lever assembly, and the receiving assembly is stored in the storage slots.

5. The remote controller of claim 4, wherein:
the receiving assembly has elasticity.

6. The remote controller of claim 4, wherein:
the remote-control lever assembly includes a first remote-control lever and a second remote-control lever;
the receiving assembly includes a first receiving element corresponding to the first remote-control lever, and a second receiving element corresponding to the second remote-control lever;
the first remote-control lever is received in the first receiving element after being detached; and
the second remote-control lever is received in the second receiving element after being detached.

7. The remote controller of claim 6, wherein:
each of the first receiving element and the second receiving element is connected to a corresponding storage slot of the storage slots.

8. The remote controller of claim 7, wherein:
each of the first receiving element and the second receiving element is connected to the corresponding storage slot of the storage slots by at least one of an elastic snapping, a magnetic connection, or a bonding.

9. The remote controller of claim 6, wherein:
each of the first receiving element and the second receiving element includes a bottom plate, two oppositely-disposed side plates, a front block, and a rear block, wherein the two oppositely-disposed side plates, the front block, and the rear block are respectively disposed on a same surface of the bottom plate, the front block and the rear block are disposed at two opposite ends of the bottom plate, and the two oppositely-disposed side plates are disposed on other two ends of the bottom plate.

10. The remote controller of claim 9, wherein:
when the first remote-control lever and the second remote-control lever are respectively received by the first receiving element and the second receiving element after being detached, the front blocks of the first receiving element and the second receiving element abut respectively against ends of control ends of the first remote-control lever and the second remote-control lever, and the rear blocks of the first receiving element and the second receiving element abut respectively against ends of connection ends of the first remote-control lever and the second remote-control lever, thereby restricting movement of the first remote-control lever and the second remote-control lever in respective axial directions.

11. The remote controller of claim 10, wherein:
the ends of the connection ends of the first remote-control lever and the second remote-control lever are in an exposed state to allow an ease pullout of the first remote-control lever and the second remote-control lever.

12. The remote controller of claim 9, wherein:
heights of the two oppositely-disposed side plates of the first receiving element and the second receiving element at sides respectively corresponding to the control ends are greater than a radius of the control ends, and a relative distance between tops of the two oppositely-disposed side plates of the first receiving element and the second receiving element at the sides respectively corresponding to the control ends is smaller than a diameter of the control ends.

13. The remote controller of claim 9, wherein:
a width of the bottom plate is gradually narrowed in a direction from the rear block toward the front block.

14. The remote controller of claim 9, wherein:
the heights of the two oppositely-disposed side plates gradually decrease in the direction from the rear block toward the front block.

15. The remote controller of claim 6, wherein:
the clamp assembly includes a first clamp element and a second clamp element, and each of the first clamp element and the second clamp element is movably connected to a side of the remote controller main body.

16. The remote controller of claim 15, wherein:
each of the first clamp element and the second clamp element includes a connection rod and a clamp part, one end of the connection rods of the first clamp element and the second clamp element is movably connected to the remote controller main body, another end of the connection rods of the first clamp element and the second clamp element is connected to the corresponding clamp parts, and each of the first clamp element and the second clamp element is capable of folding or unfolding from the remote controller main body.

17. The remote controller of claim 16, wherein:
when the first clamp element and the second clamp element are in an unfolded state, the first receiving element and the second receiving element are in an unobstructed state; and when the first clamp element and the first clamp element are in a folded state, the first receiving element and the second receiving element are respectively covered by the first clamp element and the second clamp element.

* * * * *